R. BALL.
CONTROL FOR PNEUMATIC DESPATCH APPARATUS.
APPLICATION FILED NOV. 2, 1911.
1,124,255.
Patented Jan. 12, 1915.
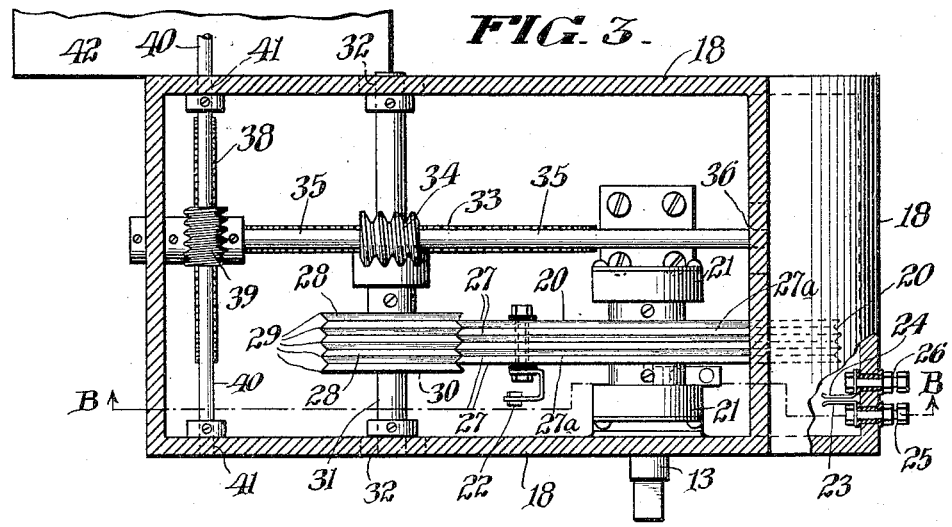
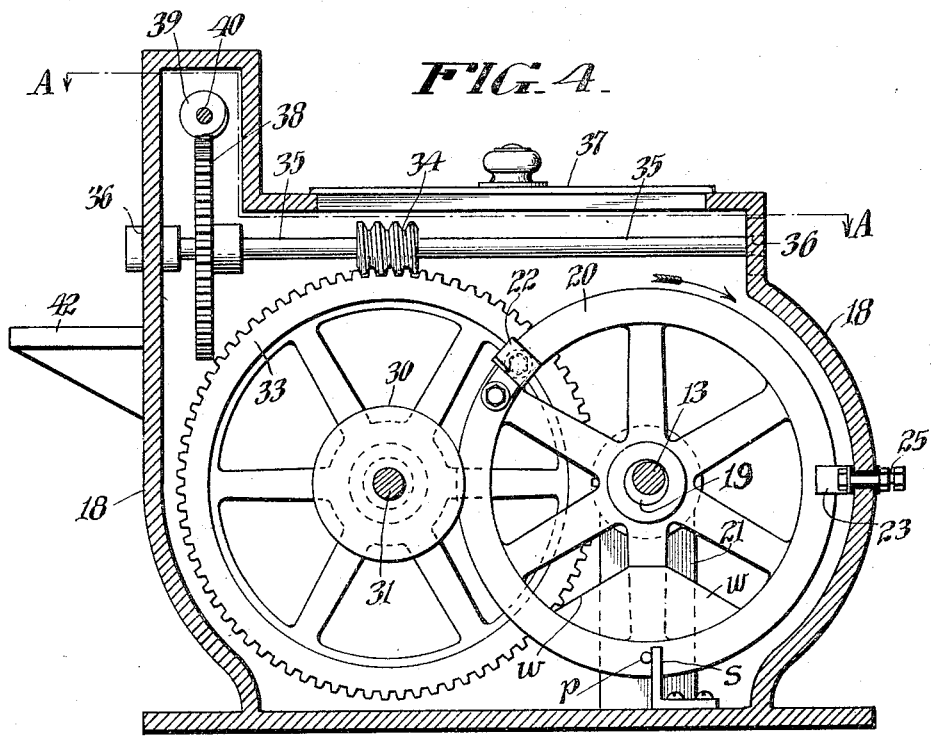

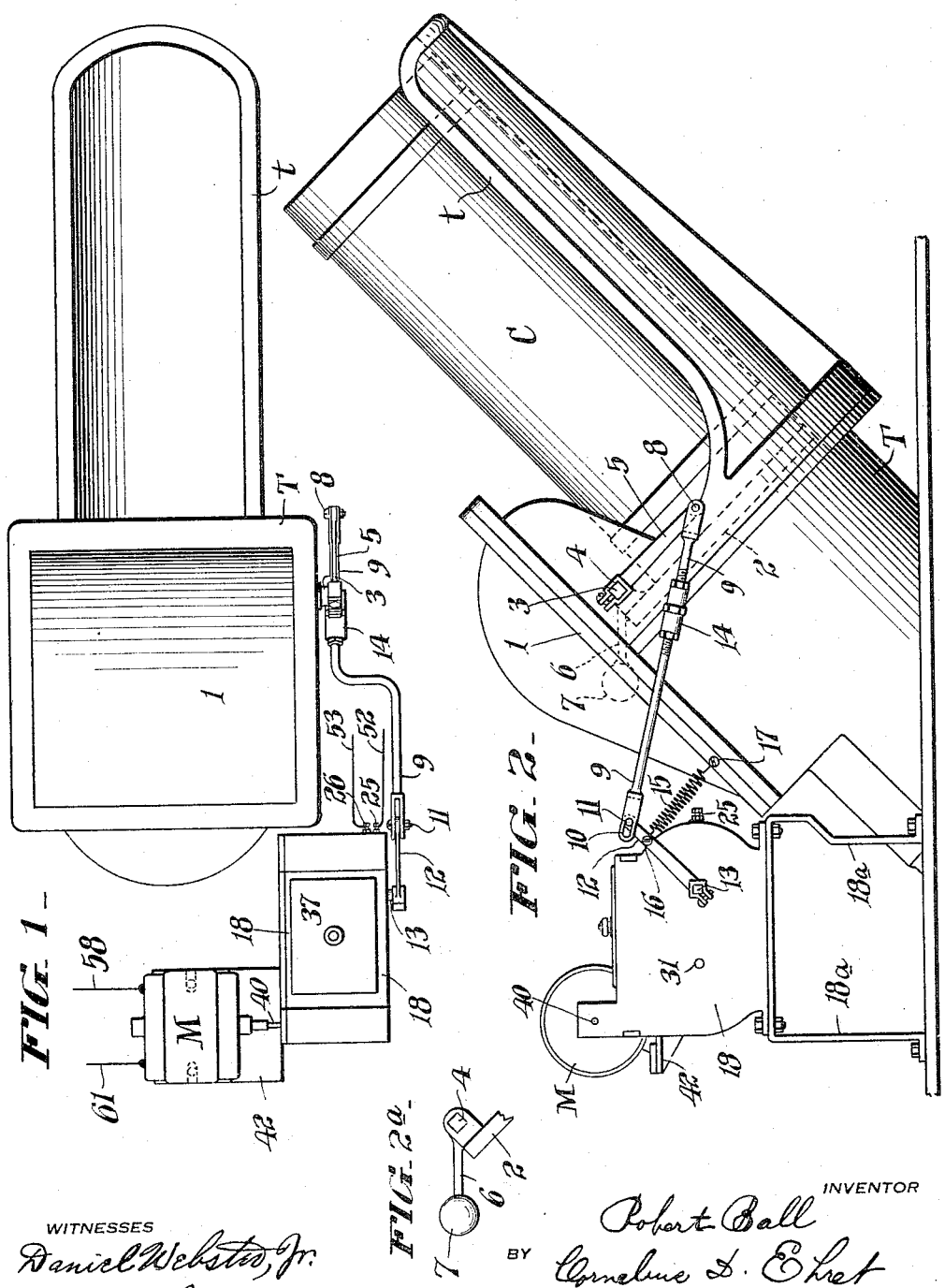

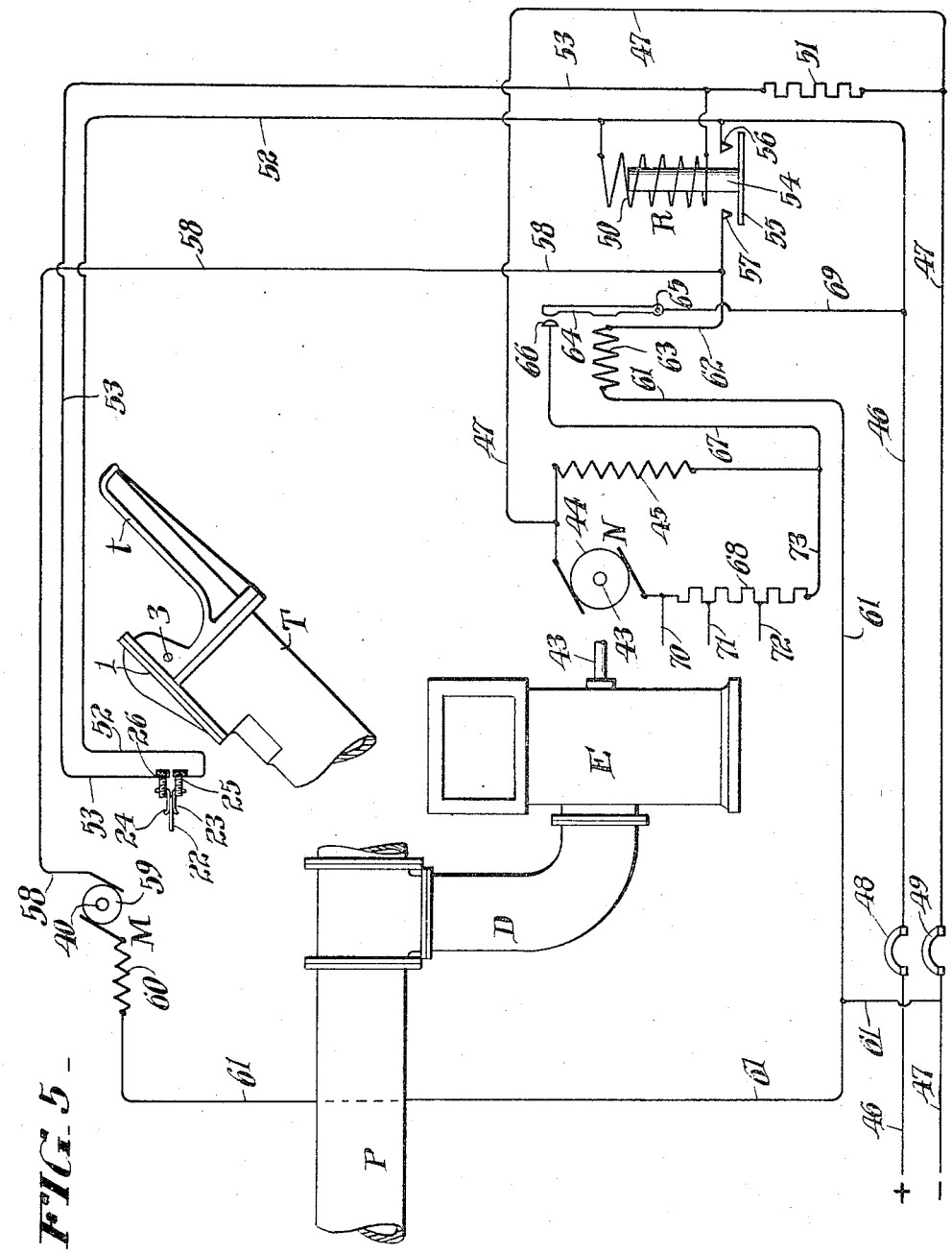

UNITED STATES PATENT OFFICE.

ROBERT BALL, OF PHILADELPHIA, PENNSYLVANIA, ASSIGNOR TO THE INTERNATIONAL PNEUMATIC TUBE COMPANY, A CORPORATION OF MAINE.

CONTROL FOR PNEUMATIC-DESPATCH APPARATUS.

1,124,255.  Specification of Letters Patent.  Patented Jan. 12, 1915.

Application filed November 2, 1911. Serial No. 658,081.

*To all whom it may concern:*

Be it known that I, ROBERT BALL, a citizen of the United States, residing in the city of Philadelphia, county of Philadelphia, and State of Pennsylvania, have invented certain new and useful Improvements in Control for Pneumatic-Despatch Apparatus, of which the following is a specification.

My invention relates to pneumatic tube despatch systems, and relates more particularly to apparatus for automatically starting the means which produces the current of air in the tube or pipe line upon the despatch of a carrier, and for automatically stopping such means after a predetermined time during which the carrier is enabled to reach the receiving station.

My invention resides in apparatus as above described, and resides in a timing mechanism for determining the period of time during which the apparatus supplying the motive fluid or air for the carrier is in operation, the timing mechanism controlling the automatic starting and stopping of such apparatus; and it is a further feature of my invention that the timing mechanism itself is driven by a suitable source of power which is also automatically controlled as to time of starting and stopping by the timing mechanism.

My invention resides in the features hereinafter described and claimed.

For one of the forms my invention may take reference is to be had to the accompanying drawings, in which:

Figure 1 is a top plan view of a transmitter with associated control apparatus. Fig. 2 is a side elevational view of the same. Fig. 2ª is a side elevational view of a detail, showing means for restoring part of the control apparatus. Fig. 3 is a horizontal sectional view, some parts in plan view, of time control apparatus taken on the line A—A, Fig. 4. Fig. 4 is a vertical sectional view, some parts in side elevation, of the apparatus shown in and taken on the line B—B of Fig. 3. Fig. 5 is a diagrammatic view illustrating a system of control.

Referring to the drawings, T is a transmitter for carriers, the latter generally being hollow cylinders fitting snugly within the bore of the pipe line or tube P connecting the transmitting and receiving stations, the carriers being easily movable in such tube or pipe line due to the pressure of air exerted thereon. A part of such a carrier is indicated at C, Fig. 2, in position for despatch. The transmitter is accessible through the upper side by removal of the closing cap or lid 1.

The mouth or entry port of the transmitter is normally closed by the valve or gate 2 having a pivotal axis at 3 about which it may swing. The end of the pivot shaft is squared as indicated at 4, and secured to this squared end is the arm 5. Also secured to this pivot shaft is an arm 6 carrying at its outer end a weight 7, see Figs. 2 and 2ª, so positioned that gravity acting upon said weight 7 tends to rotate the door or valve 2 upon its pivotal axis 3 to bring the same to closing position as indicated in Fig. 2. To the end of the arm 5 there is pivoted at 8 a rod 9 having at its other end a slot 10 in which engages the pivot pin 11 carried upon the lever 12 having the pivot shaft or axis 13 provided with a squared end as indicated in Fig. 2, for securing thereto the arm 12. A turn buckle or similar device 14 is provided for adjusting the length of the rod 9. A tension spring 15 is secured at its one end at 16 to the arm or lever 12, and at its other end at 17 to any stationary member, such as the lid or cap 1. The pivot shaft 13 extends through the wall of the casing 18 which incloses the timing mechanism about to be described. Within the casing 18 and upon the shaft 13 is the eccentric 19 secured to or integral with the shaft 13. Upon this cylindrical or circular eccentric is mounted or pivoted the friction wheel 20 easily and freely rotatable upon said eccentric 19. To either side of the wheel 20 are provided the pillow blocks or bearings 21 supporting the rotatable shaft 13, and disposed within the casing 18. Carried by the wheel 20 is the electrical contact 22, insulated from and extending to one side of the wheel 20, and in whose path of travel are disposed the stationary electrical contacts 23 and 24, separated from each other and mounted upon and insulated from the casing 18. Upon the exterior of the casing 18 are the binding posts 25 and 26 communicating respectively with the contacts 23 and 24. The periphery of the wheel 20 is provided with a plurality of friction ribs 27 separated by V-shaped grooves 27ᵃ, and these ribs or ridges 27 are adapted to frictionally engage in similar grooves 28 separating similar ridges or ribs 29 upon the wheel 30 secured to the rotatable shaft 31. The ridges or ribs 29 of the wheel 30 are adapted to engage frictionally in the grooves upon the periphery of the wheel 20. The shaft 31 has the bearings 32 in the casing 18 and upon this shaft is secured also the gear wheel 33 with whose teeth meshes the worm 34 secured upon the shaft 35 having bearings 36, 36, in the casing 18. The top of the casing 18 has an opening closed by the lid or top 37 upon whose removal the parts within the casing 18 are accessible. Secured upon the shaft 35 is the gear wheel 38 with whose teeth meshes the worm 39 secured upon the shaft 40 having bearings 41, 41, in the casing 18.

The casing 18 is supported in proximity to the transmitter upon the stand 18ᵃ as seen in Fig. 2. Secured upon the casing 18 is a bracket 42 upon which is mounted the electric motor M whose armature shaft is coupled to or is the same shaft as the shaft 40.

Referring now to Fig. 5, P represents the pipe line or pneumatic tube extending from the transmitter T, at one station to a distant receiving station. Communicating with this pipe P near the transmitter T is a delivery pipe D leading from the air compressor E, which may be of any suitable type as a rotary compressor or a reciprocating compressor, for example. This compressor is driven by the shaft 43 which may be directly connected to or otherwise driven by an electric motor N whose armature is indicated at 44 and whose field winding is shown at 45, here shown, for example, as a shunt field winding. One terminal of armature 44 and one terminal of winding 45 are connected to conductor 47. The source of power is the electric circuit comprising the supply conductors 46 and 47 here indicated, by way of example merely, as the positive and negative conductors respectively of a direct current system. Included in the conductors 46 and 47 are the switches or automatic circuit breakers indicated elementally at 48 and 49 respectively.

At R is indicated an electro-magnet or solenoid, or other electro-responsive means, which controls the automatic starting and stopping of the motors M and N. The winding 50 of the solenoid or relay R has its one terminal connected to the supply conductor 46 while its other terminal is connected with the supply conductor 47 through the resistance 51. The first-mentioned terminal of the winding 50 is connected by conductor 52 through binding post 25 with contact 23; and the last-mentioned terminal of the winding 50 is connected by conductor 53 through binding post 26 with contact 24. Carried by the core or armature 54 of the solenoid or relay R is a contact 55 adapted to engage and electrically connect the contacts 56 and 57 upon the attraction of the core or armature 54, due to the energization of winding 50 by current traversing the same. The contact 56 is connected to the supply conductor 46 and also to one terminal of the winding 50. The contact 57 is connected through conductor 58 with one terminal of the motor M, here indicated as a series wound motor, by way of example, whose armature is 59 and whose field winding is 60. The other terminal of the motor M is connected by conductor 61 with the supply conductor 47. The contact 57 is connected also through a conductor 62 with one terminal of an electro-magnet or solenoid whose winding is indicated at 63 and whose other terminal is connected to conductor 61, the latter connecting, as above stated, with supply conductor 47. The switch arm 64, pivoted at 65, is adapted to be attracted by the electro-magnet or solenoid whose winding is 63, to engage the stationary contact 66 which connects by conductor 67 with the remaining terminal of the field winding 45 of the motor N and also to the terminal of the starting resistance 68. The switch lever 64 is connected by conductor 69 with the supply conductor 46. By conductors 70, 71, 72, and 73, the latter connected through conductor 67 to contact 66, various amounts of resistance may be included in the circuit of the armature 44 of the motor N during the starting period, it being understood that the actuation of the switch 64 by its winding 63 first causes the inclusion in the armature circuit of all the resistance 68, and that thereafter other devices similar to 63, 64 come successively into operation in response to movement of switch 64 cutting out more and more of the resistance 68 until the motor is at full speed, when none of the resistance 68 remains in the armature circuit. This is well understood in the art of automatic starting devices for electric motors, and is *per se* not my invention, and will be understood by any one skilled in the art.

The operation of my apparatus and system is as follows: Normally, that is, when no carrier has been despatched and no carrier is in transit between the transmitting and receiving stations, the wheel 20 has been rotated to such position that the contact 22 engages and bridges the contacts 23 and 24, which is the relative position of those contacts indicated in Fig. 5. Contacts 23 and 24 being in electrical communication with each other through the movable contact 22, the winding 50 of the relay or solenoid R is short circuited, and, therefore, deënergized, and the armature or core 54 and the bridging contact 55 are in the position indicated in Fig. 5. The resistance 51 serves to prevent short circuit of the supply conductors 46 and 47 through the contacts 22, 23 and 24, when in engagement as shown in Fig. 5. If, now, it be desired to despatch a carrier, as C, the same is placed in the chute or trough $t$ of the transmitter T, as indicated in Fig. 2. As it passes through the transmitter T it actuates the valve or gate 2 moving the same in a clockwise direction, as viewed in Fig. 2, about its pivotal axis 3 causing the rotation in a clockwise direction about the same pivotal axis 3 of weight 7 and the arm or lever 5 which moves the rod 9 toward the left, causing counter-clockwise rotation of the arm or lever 12 rotating the shaft 13 in like direction. This movement is in opposition to the spring 15 and to the weight 7, which has been raised by the introduction of the carrier. This counter-clockwise rotation of the shaft 13, as viewed, in Figs. 2, 3, and 4, rotates the eccentric 19 and shifts the wheel 20, carrying the contact 22, out of engagement with wheel 30, the wheel 20 now turning freely upon the eccentric 19 and rotating thereon under the influence of the weight $w$ carried by the wheel 20 which causes the withdrawal of the contact 22 from between the contacts 23 and 24, bringing the wheel 20 to the position shown in Figs. 3 and 4, where the pin $p$ carried by the wheel 20 comes into engagement with the stop $s$ within and secured to the casing 18, the wheel 20 having previously been in such position that the contact 22 is in engagement with the contacts 23 and 24 and the weight $w$ in a raised position to the left of shaft 13, as viewed in Fig. 4. During this free movement of the wheel 20 and the withdrawal of the contact 22 from between contacts 23 and 24, the carrier C has passed the valve or gate 2, and the latter has been returned to its normal position by weight 7, causing a further movement of eccentric 19 which brings wheel 20 into engagement with wheel 30 after contact 22 has been moved to the position shown in Fig. 4. Now that the contacts 23 and 24 are no longer in communication with each other, due to the withdrawal of contact 22, the winding 50 of the relay or solenoid R is energized by current from conductor 46 passing through said winding 50, thence through resistance 51 to conductor 47, the resistance 51 being, however, not so great as to prevent sufficient energization of said winding 50. In consequence of this energization, the armature or core 54 is attracted and the contacts 56 and 57 bridged by the contact 55. This connection now allows current to pass from conductor 46 through contact 56, bridging contact 55, contact 57, conductor 58, through the motor M, and through conductor 61 to conductor 47. This starts and maintains the motor M running so long as the contacts 56 and 57 are bridged by contact 55. The motor M consequently rotates shaft 40, worm 39, which drives gear 38, driving shaft 35, which drives worm 34, driving the gear 33, driving the shaft 31, which drives the frictional wheel 30, which in turn drives the wheel 20 in the direction of the arrow, indicated in Fig. 4. It is apparent from the construction just referred to that the wheel 20 rotates at far less speed or angular velocity than the shaft of the motor 40, and, therefore, the motor 40 makes a great number of revolutions before the desired amount of rotation of the wheel 20 is accomplished. Upon the engagement of contacts 56 and 57 by bridging contact 55, upon energization of the relay or solenoid R, (due to the withdrawal of contact 22 from between contacts 23 and 24) current passes from conductor 46 through contact 56, contact 55, contact 57, conductor 62 through the winding 63 of the electro-magnet or solenoid, thence through conductor 61 to conductor 47. As a result, the switch 64 is actuated into engagement with contact 66, whereupon current flows from conductor 46 through conductor 69, switch 64, contact 66, conductor 67, through the field winding 45 of the motor N to conductor 47, and, simultaneously, current passes from conductor 67 through conductor 73, resistance 68 and armature 44 of the motor N to the conductor 47. The motor N now has its field and armature energized and starts to rotate, driving the compressor E. As above indicated, the actuation of the switch 64 is followed by actuation of other switches in succession connecting with conductors 72, 71, and 70, respectively, thus cutting out more and more resistance 68 until it is all cut out, whereupon the motor N is running at full speed and, consequently, driving the compressor E at full speed and delivering the full amount of air through pipe D to pipe P, which air pressure, being exerted behind the carrier which has been passed through the transmitter T and past connection between the pipe D and pipe P, as well understood in this art, forces said carrier C ahead of or through the pipe P to the receiving station. Immediately the carrier C has been despatched past the door or valve 2, the weight 7 aided in a measure by the spring 15 returns the valve or door 2 to normal position indicated in the dotted lines, Fig. 2, as above stated, so that the air pressure delivered through pipe D to pipe P does not pass out through the transmitter but is exerted behind the carrier, as aforesaid. The motors M and N are now running and the wheel 20 carrying contact 22 is slowly rotated in the direction of the arrow, Fig. 4, by the motor M. And the time of travel of the contact 22 until its engagement between contacts 23 and 24 is made substantially equal to the time of transit of the carrier between the transmitting and receiving stations. And this time interval may be varied or adjusted to suit different lengths of tube lines by adjusting the contact 22 to different circumferential positions upon the wheel 20. Until the contact 22 reaches the contacts 23 and 24, both motors M and N continue to run and obviously the compressor E continues to deliver air to the pipe line P. When, however, the contact 22 reaches contacts 23 and 24, when the carrier has reached the receiving station, the winding 50 of the relay or solenoid R is short circuited, with resultant deënergization of said winding 50, whereupon the armature or core 54 falls separating the bridging contact 55 from contacts 56 and 57. In response to this breaking of contacts, the motor M is deënergized and comes to rest, and, similarly, the motor N is deënergized and comes to rest, as does, in consequence, the compressor E. In consequence, the compressor E is in operation only during the time a carrier is in transit between transmitting and receiving stations, and, in consequence, the consumption of energy in the driving means for the compressor E is limited to the time that a carrier is actually in transit, and no energy is consumed when the system is idle, that is, when no carrier is being transmitted. The result is a great saving in cost of operation of the pneumatic tube system because of this saving of power during the idle period.

For each carrier despatched the cycle of operations is as above described. If, however, a second carrier is despatched before the first carrier reaches the receiving station the eccentric 19 is shifted, thereby shifting the wheel 20 so that the wheel 20 returns to the position shown in Fig. 4, under the influence of the weight $w$, with the result that the motors M and N are not stopped until contact 22 has slowly moved over into engagement with contacts 23 and 24, which time interval is sufficient to allow the last carrier despatched to reach the receiving station.

In virtue of the slot 10, the lever 12 has lost motion with respect to the rod 9, whereby after the door or valve 2 has been returned to normal position, as indicated in Fig. 2, the spring 15 may complete the clockwise movement of the lever 12 and, in consequence, the shifting of the wheel 20 by the eccentric 19 through the medium of the shaft 13 connected to the lever 12.

While for the purposes of clearness and simplicity I have described my system as involving a direct current system of supply with direct current motors, it is to be understood that my invention is not limited to a direct current system, but is applicable equally well to single or polyphase alternating current systems, in which the motors M and N will be alternating current motors which will also be suitably controlled by means well known in the art, as by a relay or solenoid such as R.

While I have herein shown a compressor E involving the employment of air or other medium under pressure back of the carrier during its transit, it is to be understood that my invention is equally applicable as to many of its features to a suction system, that is, where the air or other medium is withdrawn from in front of the carrier causing an excess pressure back of the carrier to move the same. And it is to be understood that while the motive devices for the timing mechanism and the compressor are here shown as electric motors, as M and N, other sources of power or motive devices may be employed, such as engines or the like, and controlled in like manner by the timing mechanism.

What I claim is:

1. Timing mechanism comprising a motive device, a member adapted to be driven thereby, an eccentric upon which said member is freely movable, means for actuating said eccentric for engaging said member with or disengaging said member from said motive device, and controlling means brought into operation by said member after pre-determined movement thereof.

2. Timing mechanism comprising a motive device, a train of gearing driven thereby, a wheel adapted to be frictionally driven by said gearing, an eccentric upon which said wheel is freely movable, means for actuating said eccentric for engaging said wheel with or disengaging the same from said gearing, and controlling means brought into operation by said member after pre-determined movement thereof.

3. Timing mechanism comprising a motive device, a train of gearing driven thereby, a wheel adapted to be frictionally driven by said gearing, an eccentric upon which said wheel is freely movable, means for actuating said eccentric for engaging said wheel with or disengaging the same from said gearing, and means for rotating said wheel when disengaged from said gearing in direction opposite to that in which it is moved by said motive device when engaged with said gearing.

4. Timing mechanism comprising a motive device, a train of gearing, a member adapted to be driven by said gearing, carrier despatching means, a mechanical connection between said means and said member for disconnecting said member from and reëngaging the same with said gearing, and a circuit controlling said motive device controlled by said member.

5. Timing mechanism comprising a motive device, a member adapted to be driven thereby, carrier despatching gate, a mechanical connection from said gate to said timing mechanism for connecting and disconnecting said member from said motive device, a source of energy, and means responsive to the disconnection of said member from said motive device for connecting said motive device with said source of energy.

6. Timing mechanism comprising a motive device, a wheel adapted to be driven thereby, carrier despatching means, a mechanical connection between said means and said wheel for disconnecting said wheel from said motive device, a source of energy, and means controlled by said wheel for connecting said motive device with said source of energy.

7. Timing mechanism comprising a motive device, a friction wheel adapted to be driven thereby, carrier despatching gate, a mechanical connection from said gate to said timing mechanism for disconnecting said friction wheel from said motive device upon despatch of a carrier, a source of energy, and means controlled by said friction wheel when disconnected from said motive device for connecting said motive device with said source of energy.

8. Timing mechanism comprising a motive device, a wheel adapted to be driven thereby, carrier despatching gate, a mechanical connection from said gate to said timing mechanism for disconnecting said wheel and reconnecting said wheel with said motive device upon despatch of a carrier, means for moving said wheel while disconnected from said motive device, a source of energy, and means controlled by said wheel when disconnected from said motive device for connecting said motive device with said source of energy.

9. Timing mechanism comprising a motive device, a train of gearing driven thereby, a friction wheel adapted to be driven by said gearing, an eccentric upon which said friction wheel is freely movable, an electric circuit controlled by said wheel, and means actuated upon the despatch of a carrier for shifting said eccentric to free said wheel from said gearing.

10. Timing mechanism comprising a motive device, a train of gearing driven thereby, a friction wheel adapted to be driven by said gearing, an eccentric upon which said friction wheel is freely movable, means actuated upon despatch of a carrier for shifting said eccentric to disengage said wheel from said gearing, and coöperating electric contacts controlled by said friction wheel.

11. Timing mechanism comprising a motive device, a train of gearing driven thereby, a friction wheel adapted to be driven by said gearing, an eccentric upon which said friction wheel is freely movable, means actuated upon the despatch of a carrier for shifting said eccentric to free said wheel from said gearing, coöperating electric contacts controlled by said friction wheel, and means producing carrier moving air current controlled by said contacts.

12. In a pneumatic tube system, a transmitter gate, timing mechanism comprising a motive device, a member adapted to be driven thereby, a mechanical connection between said gate and said mechanism for disengaging said member from said motive device and reëngaging said member therewith, means controlled by said timing mechanism for starting said motive device when said gate is actuated, and fluid pressure producing apparatus stopped by said timing mechanism after a predetermined interval of time.

13. In a pneumatic tube system, timing mechanism comprising a motive device, a member adapted to be driven thereby, a carrier transmitter gate, a mechanical connection between said gate and said mechanism for uncoupling said member from and thereafter coupling said member with said motive device, means starting said motive device upon uncoupling of said member from said motive device, fluid pressure producing means, and means for stopping said fluid pressure producing means a predetermined time after said member is coupled to said motive device.

14. In a pneumatic tube system, a transmitter gate, timing mechanism comprising a motive device, a member adapted to be driven thereby, a mechanical connection between said gate and said member for disengaging said member from said motive device and reëngaging said member therewith upon the forward and backward movement of said gate, and means controlled by said timing mechanism for starting said motive device when said gate is actuated.

15. In a pneumatic tube system, a transmitter gate, timing mechanism comprising a motive device, a member adapted to be driven thereby, a mechanical connection between said gate and said member for disengaging said member from said motive device and reëngaging said member therewith upon the forward and backward movement of said gate, means controlled by said timing mechanism for starting said motive device when said gate is actuated, fluid pressure producing apparatus, and a second motive device for driving said apparatus, said driven member of said timing mechanism controlling the starting and stopping of said second motive device.

16. In a pneumatic tube system, the combination with a transmitter gate, of timing mechanism comprising a motive device, a member adapted to be driven thereby, a mechanical connection between said gate and said member for disconnecting said member from and reconnecting the same with said motive device, means responsive to the disconnection of said member from said motive device for starting said motive device, and means for moving said member while disconnected from said motive device, said motive device moving said member in opposite direction upon reconnection of said member with said motive device.

17. In a pneumatic tube system, the combination with a transmitter gate, of timing mechanism comprising a motive device, a member adapted to be driven thereby, a mechanical connection between said gate and said member for disconnecting said member from and reconnecting the same with said motive device, means responsive to the disconnection of said member from said motive device for starting said motive device, means for moving said member while disconnected from said motive device, said motive device moving said member in opposite direction upon reconnection of said member with said motive device, and means for deënergizing said motive device after predetermined movement of said member by said motive device.

18. In a pneumatic tube system, the combination with a transmitter gate, of timing mechanism comprising a motive device, a member adapted to be driven thereby, a mechanical connection between said gate and said member for disconnecting said member from and reconnecting the same with said motive device, means responsive to the disconnection of said member from said motive device for starting said motive device, means for moving said member while disconnected from said motive device, said motive device moving said member in opposite direction upon reconnection of said member with said motive device, and means for deënergizing said motive device after predetermined movement of said member by said motive device, said member remaining in engagement with said motive device after said motive device has come to rest.

19. Timing mechanism comprising a driving friction wheel, a driven friction wheel, an eccentric upon which said driven wheel is rotatable, means for shifting said eccentric to disengage said driven wheel from and reëngage the same with said driving friction wheel, a weight on said driven wheel adapted to return the same to normal position when disengaged, and a stop determining normal position of said driven wheel.

20. Timing mechanism comprising a driving friction wheel, a driven friction wheel, an eccentric upon which said driven wheel is rotatable, means for shifting said eccentric to disengage said driven wheel from and reëngage the same with said driving friction wheel, a weight on said driven wheel adapted to return the same to normal position when disengaged, a stop determining normal position of said driven wheel, and an electric circuit controlled by said driven wheel.

21. Timing mechanism comprising a driving friction wheel, a driven friction wheel, an eccentric upon which said driven wheel is rotatable, means for shifting said eccentric to disengage said driven wheel from and reëngage the same with said driving friction wheel, a weight on said driven wheel adapted to return the same to normal position when disengaged, a stop determining normal position of said driven wheel, an electric circuit controlled by said driven wheel, and an electric motor for driving said driving wheel controlled by said circuit.

In testimony whereof I have hereunto affixed my signature in the presence of the two subscribing witnesses.

ROBERT BALL.

Witnesses:
ANNA E. STEINBOCK,
ELEANOR T. MCCALL.

Copies of this patent may be obtained for five cents each, by addressing the "Commissioner of Patents, Washington, D. C."